United States Patent
Pefkianakis et al.

(10) Patent No.: US 10,820,242 B2
(45) Date of Patent: Oct. 27, 2020

(54) REROUTE NETWORK TRAFFIC FROM MILLIMETER-WAVE LINK TO WLAN TRANSMISSION

(71) Applicant: Hewlett Packard Enterprise Development LP, Houston, TX (US)

(72) Inventors: Ioannis Pefkianakis, Palo Alto, CA (US); Sanjib Sur, Ripon, WI (US)

(73) Assignee: Hewlett Packard Enterprise Development LP, Houston, TX (US)

(*) Notice: Subject to any disclaimer, the term of this patent is extended or adjusted under 35 U.S.C. 154(b) by 191 days.

(21) Appl. No.: 15/693,334

(22) Filed: Aug. 31, 2017

(65) Prior Publication Data

US 2019/0069208 A1 Feb. 28, 2019

(51) Int. Cl.
| | |
|---|---|
| *H04W 36/16* | (2009.01) |
| *H04W 36/30* | (2009.01) |
| *H04W 84/12* | (2009.01) |
| *H04W 36/14* | (2009.01) |

(52) U.S. Cl.
CPC ......... *H04W 36/165* (2013.01); *H04W 36/14* (2013.01); *H04W 36/30* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 6,569,245 | B2* | 5/2003 | Krysa | B05B 7/1404 |
| | | | | 118/302 |
| 8,565,073 | B2 | 10/2013 | Rahman et al. | |
| 8,812,833 | B2 | 8/2014 | Liu et al. | |
| 9,521,531 | B2 | 12/2016 | Mese | |
| 9,622,243 | B2 | 4/2017 | Doppler et al. | |
| 10,051,685 | B1* | 8/2018 | Pefkianakis | H04L 1/0009 |
| 2003/0087606 | A1* | 5/2003 | Dybdal | H04B 17/345 |
| | | | | 455/67.11 |
| 2004/0103282 | A1 | 5/2004 | Meier et al. | |

(Continued)

FOREIGN PATENT DOCUMENTS

| | | |
|---|---|---|
| CN | 101827409 A | 9/2010 |
| CN | 102238681 A | 11/2011 |

(Continued)

OTHER PUBLICATIONS

Implications of High Frequency Bands on Mobility, 3GPP TSG-RAN WG2 NR Adhoc, Spokane, USA, Jan. 19, 2017, 4 Pgs.

(Continued)

*Primary Examiner* — Ayaz R Sheikh
*Assistant Examiner* — Faiyazkhan Ghafoerkhan
(74) *Attorney, Agent, or Firm* — Brooks, Cameron & Huebsch, PLLC

(57) ABSTRACT

In some examples, a computing device may comprise a processing resource and a memory resource storing machine-readable instructions to cause the processing resource to proactively identify a line-of-sight (LOS) blockage of a network signal transmitted on a millimeter-wave link, and reroute network traffic from the millimeter-wave link to a wireless local area network (WLAN) transmission channel in response to identifying the LOS blockage of the network signal.

18 Claims, 4 Drawing Sheets

(56) References Cited

U.S. PATENT DOCUMENTS

| | | | | |
|---|---|---|---|---|
| 2011/0070842 | A1* | 3/2011 | Kwon | H04W 76/14 455/67.13 |
| 2012/0182954 | A1 | 7/2012 | Cordeiro et al. | |
| 2013/0308543 | A1* | 11/2013 | Cordeiro | H04W 72/02 370/328 |
| 2013/0308717 | A1* | 11/2013 | Maltsev | H04B 7/0417 375/267 |
| 2014/0362809 | A1* | 12/2014 | Kwon | H04W 36/30 370/329 |
| 2015/0055562 | A1* | 2/2015 | Shulman | H04W 40/12 370/329 |
| 2015/0063295 | A1* | 3/2015 | Himayat | H04W 24/10 370/331 |
| 2016/0066180 | A1* | 3/2016 | Cordeiro | H04W 72/02 713/171 |
| 2018/0167130 | A1* | 6/2018 | Vannucci | H04B 7/0617 |
| 2018/0213456 | A1* | 7/2018 | Jheng | H04B 17/391 |
| 2018/0331714 | A1* | 11/2018 | See | H04B 1/58 |

FOREIGN PATENT DOCUMENTS

| | | |
|---|---|---|
| CN | 103139197 A | 6/2013 |
| CN | 104025700 A | 9/2014 |
| CN | 105592513 A | 5/2016 |
| EP | 2600644 A1 | 6/2013 |

OTHER PUBLICATIONS

Millimeter-wave use cases for 5G systems: the vision of the MiWaveS project, 3GPP TSG-SA WG1 Meeting #74, Venice, Italy, May 9-13, 2016, 16 Pgs.

Zhu et al., "Demystifying 60GHz Outdoor Picocells", in Proc. of ACM MobiCom, 2014, 12 pages.

Zhou et al., "Mirror Mirror on the Ceiling: Flexible Wireless Links for Data Centers", Proceedings of the ACM SIGCOMM 2012 conference on Applications, technologies, architectures, and protocols for computer communication, pp. 443-454.

Xu et al., "Spatial and Temporal Characteristics of 60-GHz Indoor Channels", IEEE Journal on Selected Areas in Communications, vol. 20, No. 3, 2002, pp. 620-630.

X. Lagrange, "Very Tight Coupling between LTE and Wi-Fi for Advanced Offloading Procedures", in IEEE Wireless Communications and Networking Conference Workshops, 2014.

Sur et al., "BeamSpy: Enabling Robust 60 GHz Links Under Blockage", In Proceedings of the 13th Usenix Conference on Networked Systems Design and Implementation, 2016, pp. 193-206.

Sur et al., "60 GHz Indoor Networking through Flexible Beams: A Link-Level Profiling", In Proceedings of the 2015 ACM SIGMETRICS International Conference on Measurement and Modeling of Computer Systems, 14 pages.

Subramanian et al., "Minimum Interference Channel Assignment in Multi-radio Wireless Mesh Networks", IEEE Transactions on Mobile Computing, vol. 7, No. 12, 2008, pp. 1459-1473.

Rasekh et al., "Noncoherent mmWave Path Tracking", In Proceedings of the 18th International Workshop on Mobile Computing Systems and Applications, 2017, 6 pages.

Raiciu et al., "Opportunistic Mobility with Multipath TCP", Proceedings of the sixth international workshop on MobiArch, 2011, 6 pages.

Qualcomm Technologies, Inc., "LTE and Wi-Fi Convergence: Leveraging Both to Meet Capacity Demand", 2014, available online at <https://www.qualcomm.com/news/onq/2014/02/18/lte-and-wi-fi-convergence-leveraging-both-meet-capacity-demand>, 4 pages.

Pluntke et al., "Saving Mobile Device Energy with Multipath TCP", Proceedings of the sixth international workshop on MobiArch, 2011, pp. 1-6.

Peter F. M. Smulders, "Statistical Characterization of 60-GHz Indoor Radio Channels", IEEE Transactions on Antennas and Propagation, vol. 57, No. 10, 2009, pp. 2820-2829.

Pering et al., "CoolSpots: Reducing the Power Consumption of Wireless Mobile Devices with Multiple Radio Interfaces", Proceedings of the 4th international conference on Mobile systems, applications and services, 2006, pp. 220-232.

Nitsche et al., "Steering with Eyes Closed: mm-Wave Beam Steering without In-Band Measurement", in IEEE INFOCOM, 2015, 9 pages.

Monica Alleven, "Verizon applauds FCC chairman's move to 5G spectrum", 2015, available online at <https://www.fiercewireless.com/tech/verizon-applauds-fcc-chairman-s-move-to-5g-spectrum>, 3 pages.

Mahindra et al., "A Practical Traffic Management System for Integrated LTE-WiFi Networks", Proceedings of the 20th annual international conference on Mobile computing and networking, 2014, pp. 189-200.

Jason Furman et al., "Unlocking the Promise of Broadband for All Americans," 2016, available online at <https://obamawhitehouse.archives.gov/blog/2016/07/15/unlocking-promise-broadband-generate-gains-all-americans>, 6 pages.

IEEE Standards Association., "IEEE Standards 802.11ac-2013: Enhancements for Very High Throughput for Operation in Bands below 6 GHz", 2013, available online at <https://standards.ieee.org/standard/802_11ac-2013.html>, 38 pages.

Halperin et al., "Augmenting Data Center Networks with Multigigabit Wireless Links", Proceedings of the ACM SIGCOMM 2011 conference, pp. 38-49.

European Search Report and Search Opinion Received for EP Application No. 17198681.3, dated Jan. 4, 2019, 11 pages.

ECMA International, "Standard ECMA-387: High Rate 60 GHz PHY, MAC and PALs," 2010, available online at <https://www.ecma-international.org/publications/files/ECMA-ST/ECMA-387.pdf>, 302 pages.

Draves et al., "Routing in Multi-Radio, Multi-Hop Wireless Mesh Networks", Proceedings of the 10th annual international conference on Mobile computing and networking, 2004, pp. 114-128.

Collonge et al., "Influence of the Human Activity on Wide-Band Characteristics of the 60 GHz Indoor Radio Channel", IEEE Transactions on Wireless Communications, vol. 3, No. 6, 2004, pp. 2396-2406.

Cecilia Sulhoff ,"FCC Promotes Higher Frequency Spectrum for Future Wireless Technology", Oct. 22, 2015, 2 pages.

Bennis et al., "When Cellular Meets WiFi in Wireless Small Cell Networks", IEEE Communications Magazine, vol. 51, No. 6, 2013, 6 pages.

Aruba Networks, Inc., "Carrier-Class Public WiFi for 3G/4G Offload", 2012, available online at <https://www.arubanetworks.com/pdf/solutions/CO_ServiceProvider.pdf>, 4 pages.

Anderson et al., "In-Building Wideband Multipath Characteristics at 2.5 & 60 GHz", In IEEE Vehicular Technology Conference (VTC), vol. 56, No. 1, 2002, pp. 97-101.

Alicherry et al., "Joint Channel Assignment and Routing for Throughput Optimization in Multi-radio Wireless Mesh Networks", IEEE Journal on Selected Areas in Communications, vol. 24, Issue 11, Nov. 2006, pp. 1960-1971.

Agarwal et al., "SwitchR: Reducing System Power Consumption in a Multi-Client, Multi-Radio Environment", In IEEE International Symposium on Wearable Computers, 2008, 11 pages.

"Wireless Gigabit (WiGig) Market Size to Reach $7.42 Billion by 2024", in Grand View Research Report, Oct. 2016, 6 pages.

"Qualcomm Atheros and Wilocity Announce Tri-band Wi-Fi: Industry's First Standards-compliant, Multi-Gigabit Wireless Chipset", in www.qualcomm.com, 2011, 4 pages.

* cited by examiner

REROUTE NETWORK TRAFFIC FROM MILLIMETER-WAVE LINK TO WLAN TRANSMISSION

BACKGROUND

Various wireless communication systems are known today to provide communication links between devices, whether directly or through a network. Such communication systems range from national and/or international cellular telephone systems, the Internet, point-to-point in-home systems, as well as other systems. Wireless devices typically operate within certain radio frequency ranges or bands established by one or more communication standards or protocols. Some wireless local area network (WLAN) protocols can utilize a 2.4 gigahertz (GHz) band and others can utilize higher frequency bands. Additionally, higher frequencies in the millimeter-wave range are being utilized, such as 60 GHz standards

DETAILED DESCRIPTION

Figure 1:
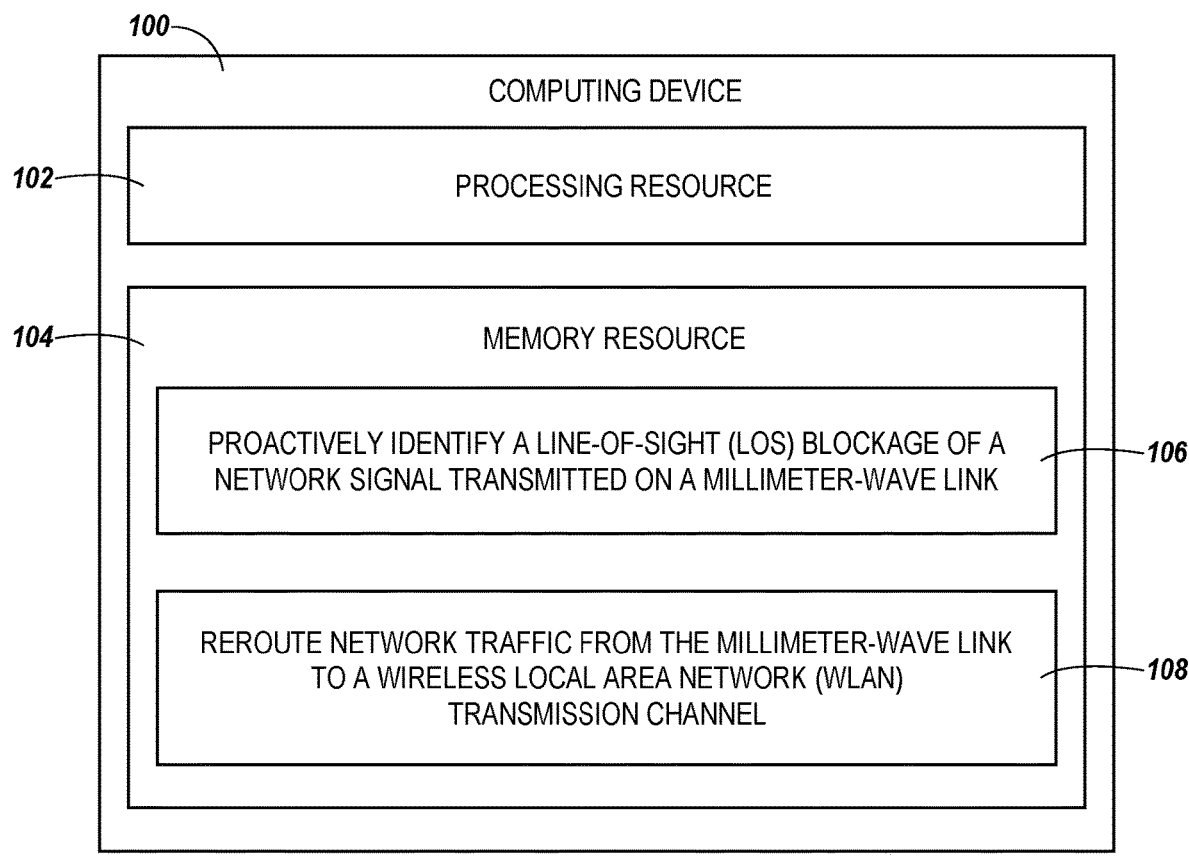
FIG. 1 illustrates an example of a computing device to enable rerouting network traffic from millimeter-wave link to WLAN transmission channel consistent with the present disclosure.

A device may include a processing resource such as electronic circuitry to execute instructions stored on machine-readable medium to perform various operations. Computing devices may be static or mobile. A static computing device may include a computing device designed for regular use in a single location. For example, a static computing device may include a desktop computer or other computing device that is utilized in a single location. A computing device may include a portable computing device that is designed to be used in a variety of settings and to be transported between the two with relatively little effort. A computing device may combine inputs, outputs, components, and capabilities that are otherwise separate in a static computing device. A computing device may include a laptop computer, smartphone, other smart device, a tablet computer, a personal digital assistant, a convertible laptop, etc.

Using high frequency band (e.g., 60 GHz Band) technology, high data rate transfers, such as real-time uncompressed/compressed high-definition (HD) audio and video streams, may be transferred wirelessly between two devices. Although high frequency band transmissions allow for higher data rate transfer than the currently practiced WLAN transmissions, a user may encounter line-of-sight (LOS) transmission properties at a high frequency band (e.g., 60 GHz).

In some instances, a user of a computing device may operate the computing device using a number of network connections (WLAN, Long-Term Evolution (LTE), millimeter-wave range network, etc.). However, when the computing device is operating in a millimeter-wave range network, LOS blockage may occur. For example, a user watching a program or movie content (such as High-Definition (HD) programming) on a HD display, in which the content is being streamed over the air using a high frequency band, may experience interruptions if the content source is blocked from the display or the content source moves out of range of the display. In general, LOS may refer to a level of obstruction on a path between two points within a wireless network coverage area. The level of obstruction in a LOS (also referred to as "LOS blockage" hereinafter) may be determined not only by the visibility from one point to the other, but also the quality of signal reception for wireless transmissions.

As such, the device can detect the LOS blockage occurring while operating in a first network connection and in response to detecting the LOS blockage, the device can introduce a seamless, low-latency interface switching function, which aims to proactively reroute the network traffic to a second network connection. For example, the function can be a Fast Session Transfer (FST) function. For example, the device may reroute network traffic to a WLAN connection, when a high frequency network connection is not feasible due to LOS blockages.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 illustrates an example of a computing device 100 to enable rerouting network traffic from millimeter-wave link to WLAN transmission channel consistent with the present disclosure. The computing device 100 can be, for example, a laptop computer, a desktop computer, or a mobile device, among other types of computing devices. As illustrated in FIG. 1, the computing device 100 can include a processing resource 102. The computing device 100 may further include a memory resource 104 coupled to the processing resource 102, on which instructions may be stored, such as instructions 106 and 108. Although the following descriptions refer to a single processing resource and a single memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

Processing resource 102 may be a central processing unit (CPU), a semiconductor based microprocessor, and/or other hardware devices suitable for retrieval and execution of instructions stored in memory resource 104. Processing resource 102 may fetch, decode, and execute instructions 106 and 108, or a combination thereof. As an alternative or in addition to retrieving and executing instructions, processing resource 102 may include at least one electronic circuit that includes electronic components for performing the functionality of instructions 106 and 108, or a combination thereof.

Memory resource 104 can be volatile or nonvolatile memory. Memory resource 104 can also be removable (e.g., portable) memory, or non-removable (e.g., internal)

memory. For example, memory resource 104 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM), flash memory, a laser disc, a digital versatile disk (DVD) or other optical disk storage, and/or a magnetic medium such as magnetic cassettes, tapes, or disks, among other types of memory.

Instructions 106, when executed by processing resource 102, may cause the processing resource 102 to proactively identify a LOS blockage of a network signal transmitted on a millimeter-wave link. As described herein, the processing resource 102 can proactively identify a LOS blockage of network signals of additional connection types. For example, the connection type can include WLAN, LTE, millimeter-wave range, etc. In some examples, a first connection type can be a very high frequency (VHF) communication, such as a 60 GHz network or a 28 GHz network. IEEE 802.11 ad devices can operate on the 60 GHz network with up to 2.16 GHz of channel bandwidth. As described herein, IEEE 802.11ad supports a beamforming training (BFT) process to determine the highest signal strength transmitting (Tx) and receiving (Rx) beams between a pair of devices. BFT can comprise of a mandatory Sector Level Sweep (SLS) phase and an optional Beam Refinement Phase (BRP), which can hierarchically evaluate the Tx and Rx beam combinations, to identify the best beam.

As described herein, the LOS blockage of the network signal of the millimeter-wave link can be based on a difference between a first signal-to-noise ratio (SNR) of the millimeter-wave link and a second SNR of the WLAN transmission channel. The SNR can compare a level of signal power to a level of noise power and can be expressed as a measurement of decibels (dB). The processing resource 102 can determine the second SNR of additional connection types which can be compared to the first SNR. For example, additional connection types can include WLAN, LTE, millimeter-wave range, etc. In some examples, a second connection type can be a WLAN network. IEEE 802.11ac devices can operate on the WLAN network, with up to 160 MHz of channel bandwidth.

As described herein, the millimeter-wave band can operate at 60 GHz. However, a network signal of a millimeter-wave band of 60 GHz can be subject to disruption due to LOS blockage by obstacles such as furniture, walls, and moving obstacles such as humans. For example, millimeter-wave bands may include electromagnetic waves, which can be susceptible to blockages because of their limited ability to diffract around obstacles that are larger than the wavelength. For example, a wavelength at 60 GHz can be 5 millimeters and it can be difficult for the waves to diffract around obstacles that are larger than 5 millimeters.

As described herein, the computing device 100 can proactively identify a LOS blockage by comparing the SNR of the millimeter-wave link and the SNR of the WLAN transmission channel. For example, the computing device 100 can identify the LOS blockage by comparing the SNR between a high frequency beam and a WLAN path. The computing device 100 can identify the LOS blockage by comparing the SNR between a high frequency beam and a WLAN path as a result of the obstacles and NLOS reflectors having an effect on signal strength change of high frequency band signals and WLAN signals because of their frequency difference. The computing device 100 can determine the SNR of a particular high frequency beam. For example, the computing device 100 can determine the SNR of the high frequency beam that is determined to have the highest signal strength Tx and Rx beams between a pair of devices which are attempting to connect.

Furthermore, the computing device 100 can determine the SNR of a particular WLAN path. As described herein, to calculate particular path strength at WLAN, the computing device 100 can select the channel state information (CSI) of a WLAN antenna which is physically closest to a high frequency phased-array antenna. CSI refers to known channel properties of a communication link. For example, CSI can describe how a signal propagates from a transmitter to a receiver and can represent the combined effect of, for example, scattering, fading, and power decay with distance. Furthermore, the computing device 100 can use a particular tap strength of its power-delay profile. In some examples, the computing device 100 can use the strongest tap strength of its power-delay profile. For example, the power-delay profile can provide the intensity of a signal received through a multipath channel as a function of time delay. The time delay can be the difference in travel time between multipath arrivals.

Furthermore, the computing device 100 can compare the difference of the SNR between the high frequency beam and the WLAN path over a predetermined time interval. For example, the time interval can be set to 5 milliseconds.

As described herein, a difference following a hardware link budget difference with a high probability may indicate an open LOS. An open LOS can indicate that no obstacles exist between a transmitter and a receiver that would interrupt the network signal. For example, when the LOS is open the signal strength difference distribution between a high frequency beam and a WLAN path closely match a predetermined hardware power budget difference. In some examples, the hardware power budget difference can be determined through experimental measures or estimated based on high frequency and WLAN transmitter characteristics. For example, high frequency and WLAN transmitter characteristics can include transmission power, antenna gains, etc. In some examples, the hardware power budget can be the maximum amount of power that can be transmitted. For example, the hardware power budget difference can be 27 dB. The hardware power budget difference can include transmit power, beamforming gain and noise power difference between the high frequency and WLAN interface.

However, the computing device 100 can detect a LOS blockage when the difference of the SNR between the high frequency beam and the WLAN path over a predetermined time interval exceeds a predetermined threshold. For example, the threshold can be set to 3 decibels (dB). As described herein, as a result of a LOS blockage (or partial LOS blockage), the SNR difference diverges significantly from the hardware power budget difference. Thus, when the difference of the SNR between the high frequency band beam and the WLAN path over the predetermined time interval exceeds a predetermined threshold from the hardware power budget difference, the computing device 100 can determine that there is a LOS blockage.

Furthermore, to prevent false blockage determination, the computing device 100 can also monitor the high frequency band's physical-layer (PHY) rate. The PHY rate can indicate the speed at which a device communicates with a network device. For example, the PHY rate can indicate the speed at which a device communicates with an access point (AP). An AP can transmit and receive network traffic between multiple user devices. For example, an average PHY rate that is less than a predetermined minimum PHY rate can be an indication that an LOS blockage exists. Thus, a low PHY rate can indicate poor network connectivity as a result of an LOS blockage. Additional indications that LOS blockage exists can include additional Media Access Control (MAC)-layer feedback. For example, additional MAC-layer feedback can include Packet-Error-Rate (PER) and PHY transmission rate statistics. For example, an increase in the PER and/or a decrease in the PHY transmission rate can indicate LOS blockage.

Instructions 108, when executed by processing resource 102, may cause the processing resource 102 to reroute network traffic from the millimeter-wave link to a WLAN transmission channel in response to identifying the LOS blockage of the network signal. As described herein, to enable a transition between an IEEE 802.11ad and a IEEE 802.11 ac interface on a single computing device, IEEE 802.11ad can support an optional Fast Session Transfer (FST) feature. For example, IEEE 802.11ad can specify the MAC-level control and coordination procedures between the AP and the user, which may allow network traffic to reroute between the millimeter-wave link and the WLAN transmission channel, such as a WLAN and a high frequency network As described herein, rerouting network traffic from the millimeter-wave link to the WLAN transmission channel can be achieved by a FST function. For example, the FST function can be a seamless, low-latency interface switching function, which aims to proactively reroute network traffic to a WLAN, when use of a high frequency network is not possible due to LOS blockages, allowing for continued connectivity. In some examples, the computing device 100 may also scan for alternative high frequency beams to sustain a connection. For example, the computing device 100 may determine that rerouting the network traffic to an alternative high frequency beam may prevent a disruption in the connection between two devices.

Figure 2:
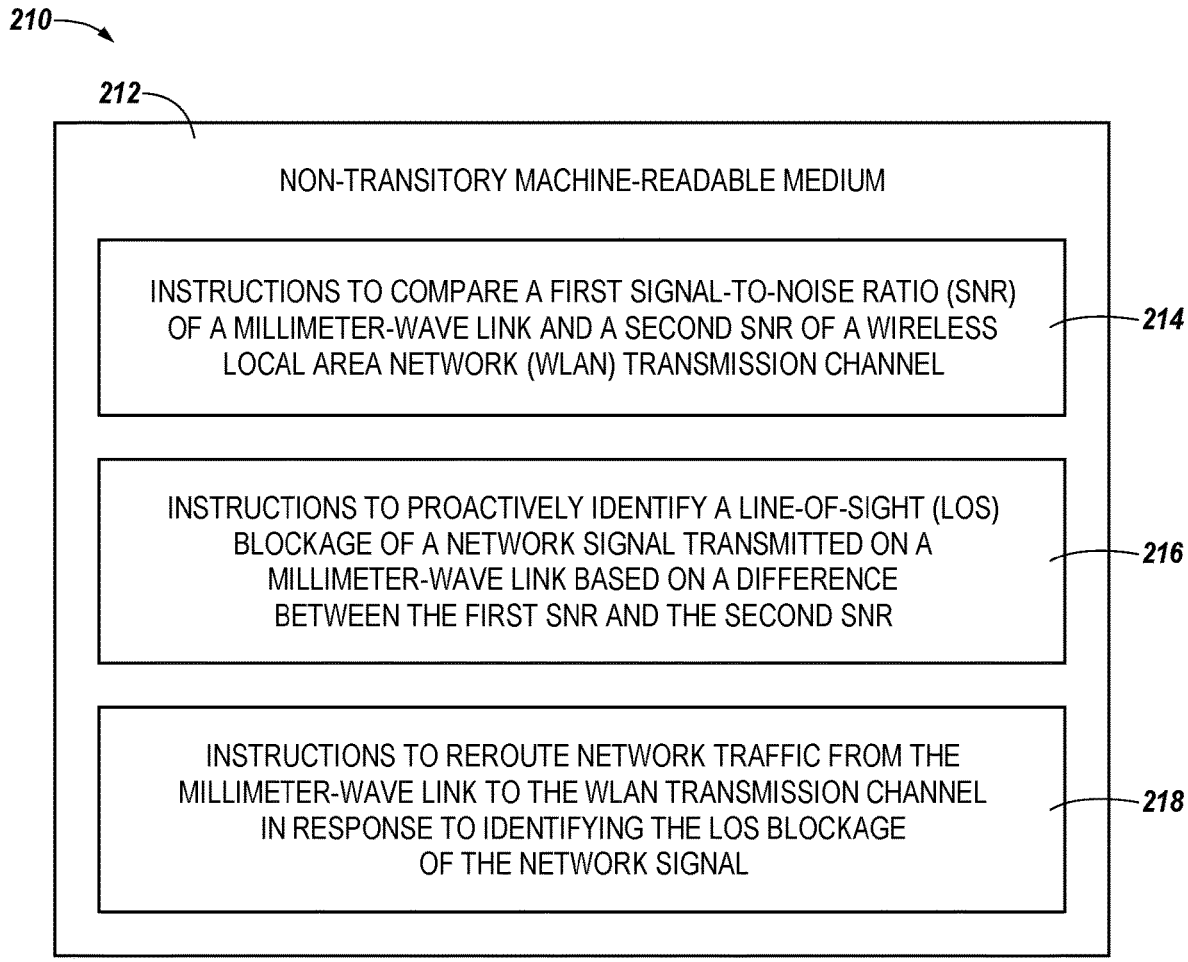
FIG. 2 illustrates an example of a system to enable rerouting network traffic from millimeter-wave link to WLAN transmission channel consistent with the present disclosure.

FIG. 2 illustrates an example of system 210 to enable network session transfer consistent with the present disclosure. System 210 may include a non-transitory machine readable storage medium 212. Non-transitory machine readable storage medium 212 may be an electronic, magnetic, optical, or other physical storage device that stores executable instructions. Thus, non-transitory machine readable storage medium 212 may be, for example, Random Access Memory (RAM), an Electrically-Erasable Programmable Read-Only Memory (EEPROM), a storage drive, an optical disc, and the like. Non-transitory machine readable storage medium 212 may be disposed within system 210, as shown in FIG. 2. In this example, the executable instructions may be "installed" on the system 210. Additionally and/or alternatively, non-transitory machine readable storage medium 212 may be a portable, external or remote storage medium, for example, that allows system 210 to download the instructions from the portable/external/remote storage medium. In this situation, the executable instructions may be part of an "installation package". As described herein, non-transitory machine readable storage medium 212 may be encoded with executable instructions for a performance threshold.

Instructions 214 may include instructions to compare a first SNR of a millimeter-wave link and a second SNR of a WLAN transmission channel. For example, the millimeter-wave link and the WLAN transmission channel can be based on an IEEE 802.11ad, IEEE 802.15.3c, ECMA or millimeter-wave protocol specification. In some examples, the computing device may perform a 802.11ad beam scan of a WLAN network to detect a high frequency network.

As described herein, the millimeter-wave link can be a high frequency network. In some examples, the computing device can determine the SNR of particular high frequency network beam. For example, the computing device can determine the high frequency beam which has the highest signal strength Tx and Rx beams between the pair of devices which are attempting to maintain a connection. Furthermore, the computing device can determine the SNR of the millimeter-wave link over a predetermined time interval.

As described herein, the WLAN transmission channel can be a WLAN network. In some examples, the computing device can determine the SNR of a particular WLAN path, based on the WLAN path's signal strength. For example, the computing device can calculate the signal strength of the available WLAN paths by selecting the CSI of a WLAN antenna that is physically closest to a high frequency phased-array antenna. Furthermore, the computing device can determine the SNR of the WLAN path over a predetermined time interval.

As described herein, a difference following a hardware link budget difference with a high probability may indicate an open LOS, which can indicate that the network traffic does not require rerouting from the millimeter-wave link to the WLAN transmission channel. For example, when the LOS is open, the signal strength difference distribution between a high frequency beam and a WLAN path closely match a predetermined hardware power budget difference.

Instructions 216 may include instructions to proactively identify a LOS blockage of a network signal transmitted on a millimeter-wave link based on a difference between the first SNR and the second SNR. As described herein, the computing device can detect a LOS blockage when the difference of the SNR between a high frequency beam and a WLAN path over the predetermined time interval exceeds a predetermined threshold. For example, the threshold can be set to 3 dB. As described herein, as a result of a LOS blockage, the SNR difference diverges significantly from the hardware power budget difference. For example, where the difference of the SNR between the high frequency beam and the WLAN path for an interval exceeds a predetermined threshold from the hardware power budget difference, the device determines that there is LOS blockage.

As described herein, the computing device can proactively identify LOS blockage of the signal transmitted on a millimeter-wave link utilizing PHY layer feedback and high frequency MAC-layer feedback. In some examples, PHY layer feedback can include WLAN and 60 GHz CSI. In some examples, the high frequency MAC-layer feedback can include PER and PHY transmission statistics.

As described herein, to prevent false blockage, the computing device can also monitor the high frequency PHY rate. For example, an average PHY rate that is less than a predetermined minimum PHY rate can be an indication that an LOS blockage exists. Thus, a low PHY rate can indicate poor network connectivity as a result of an LOS blockage. Additional indications that an LOS blockage exists can include additional MAC-layer feedback.

Instructions 218 may include instructions to reroute network traffic from the millimeter-wave link to the WLAN transmission channel in response to identifying a LOS blockage of the network signal. As described herein, to enable a transition between an IEEE 802.11ad and an IEEE 802.11ac interface on a single computing device, IEEE 802.11ad can support an optional FST feature. For example, IEEE 802.11ad can specify the MAC-level control and coordination procedures between the AP and the user, which may allow network traffic to reroute between the millimeter-wave link to the WLAN transmission channel, such as a high frequency network and WLAN network.

As described herein, rerouting network traffic from the millimeter-wave link to the WLAN transmission channel can be achieved by a FST function. For example, the FST function can be a seamless, low-latency interface switching function, which aims to proactively reroute network traffic to a WLAN, when use of a high frequency network is not possible due to LOS blockages, allowing for continued connectivity. In some examples, the computing device may also scan for alternative high frequency beams to sustain a connection.

Figure 3:
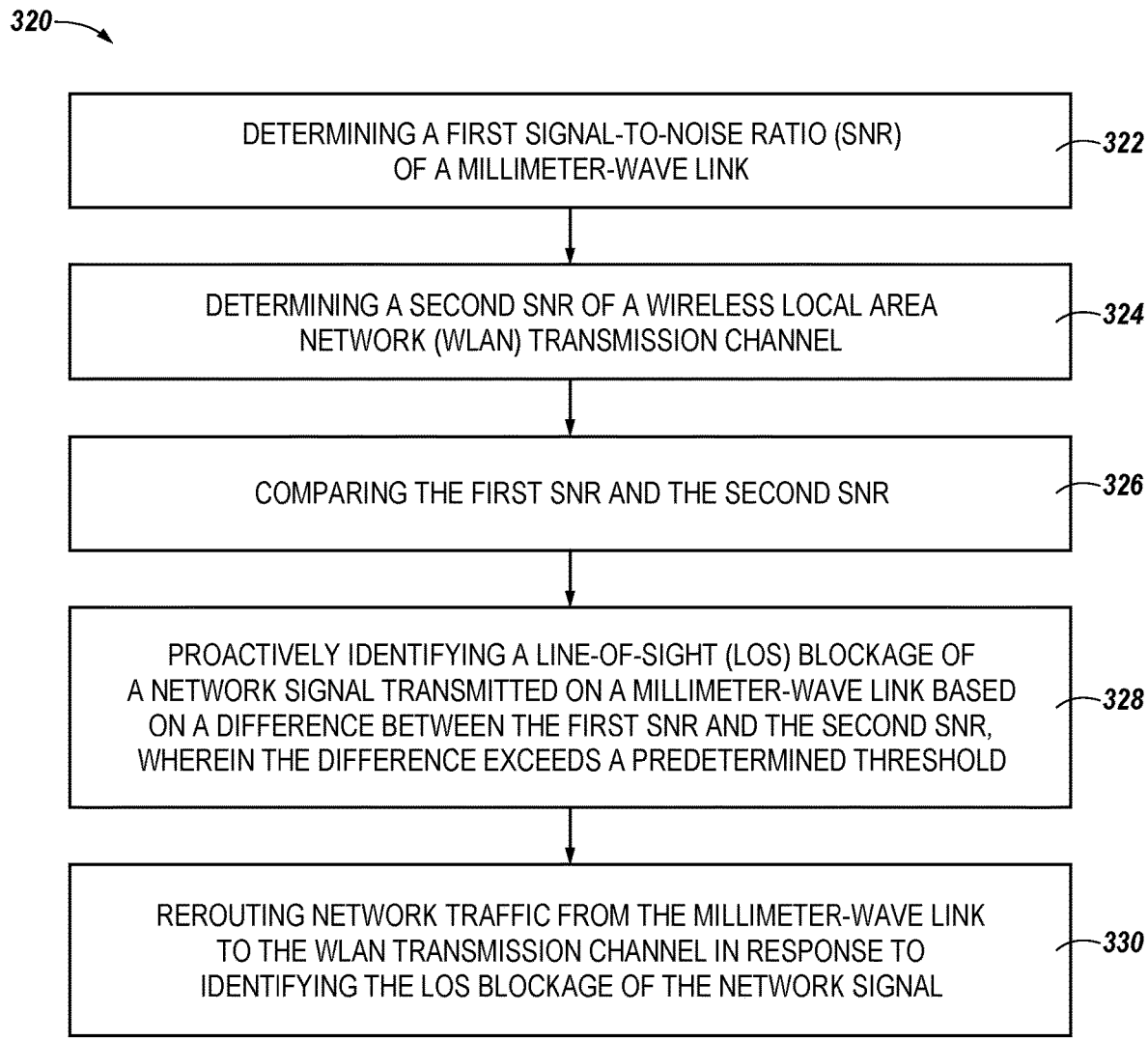
FIG. 3 illustrates an example of a method for rerouting network traffic from millimeter-wave link to WLAN transmission channel consistent with the present disclosure

FIG. 3 illustrates an example of a method 320 for network session transfer consistent with the present disclosure. In some examples, the method 320 can be performed by a computing device, as described herein.

As described herein, at 322, the method 320 can include determining a first SNR of a millimeter-wave link. In some examples, the millimeter-wave link can be a high frequency network. As described herein, the SNR can be used to compare a level of signal power to a level of noise power and can be expressed as a measurement of decibels (dB).

As described herein, determining the first SNR of a high frequency network can include determining the high frequency beam among multiple high frequency beams that have the highest signal strength Tx and Rx beams between a pair of devices which are attempting to connect. Furthermore, the SNR of the millimeter-wave link can be determined over a predetermined time interval, such as 5 milliseconds.

As described herein, at 324, the method 320 can include determining a second SNR of a WLAN transmission channel. For example, the WLAN transmission channel can include any channel in one of the following five frequency ranges: 2.4 GHz, 3.6 GHz, 4.9 GHz, 5 GHz, and 5.9 GHz bands. The WLAN transmission channel may overlap with another WLAN transmission channel. IEEE 802.11ac devices can operate on a WLAN with up to 160 MHz of channel bandwidth.

As described herein, determining the SNR of the WLAN network can include selecting a particular WLAN path. For example, determining the second SNR of the WLAN can include selecting the CSI of a WLAN antenna which is physically closest to a high frequency phased-array antenna. As described herein, CSI refers to known channel properties of a communication link. For example, CSI can describe how a signal propagates from a transmitter to a receiver and can represent the combined effect of, for example, scattering, fading, and power decay with distance. Furthermore, the SNR of the WLAN transmission channel can be determined over a predetermined time interval, such as 5 milliseconds.

As described herein, at 326, the method 320 can include comparing the first SNR and the second SNR. In some examples, comparing the first SNR and the second SNR can determine whether there is an open LOS or partially open LOS. For example, when the LOS is open, the signal strength difference distribution between a high frequency beam and a corresponding WLAN path closely match a predetermined hardware power budget difference.

In some examples, the signal strength difference distribution between the millimeter-wave link and the WLAN transmission channel over the predetermined time interval can indicate whether there is a LOS blockage. As described herein, the network traffic can be rerouted from the millimeter-wave link to the WLAN transmission channel if there is a LOS blockage.

As described herein, at 328, the method 320 can include proactively identifying a LOS blockage of a network signal transmitted on a millimeter-wave link based on a difference between the first SNR and the second SNR, wherein the difference exceeds a predetermined threshold. For example, the computing device can detect a LOS blockage when the difference of the SNR between the high frequency beam and the WLAN path over a predetermined time interval exceeds a predetermined threshold. For example, the threshold can be set to 3 dB. As described herein, as a result of a LOS blockage, the SNR difference diverges significantly from the hardware power budget difference. Thus, where the difference of the SNR between the high frequency beam and the WLAN path for an interval exceeds a predetermined threshold from the hardware power budget difference, the device determines that there is a LOS blockage.

Furthermore, to prevent false blockage, the computing device can also monitor the high frequency PHY rate. The PHY rate can indicate the speed at which a device communicates with an AP. For example, an average PHY rate that is less than a predetermined minimum PHY rate can be an indication that an LOS blockage exists. Thus, a low PHY rate can indicate poor network connectivity as a result of an LOS blockage. Additional indications that an LOS blockage exists can include additional AC-layer feedback. For example, additional MAC-layer feedback can include PER and PHY transmission rate statistics.

As described herein, at 330, the method 320 can include rerouting network traffic from the millimeter-wave link to the WLAN transmission channel in response to identifying a LOS blockage of the network signal. As described herein, to enable a transition between an IEEE 802.11ad and an IEEE 802.11ac interface on a single computing device, IEEE 802.11ad can support an optional FST feature. For example, IEEE 802.11ad can specify the MAC-level control and coordination procedures between the AP and the user, which may allow network traffic to reroute between the millimeter-wave link and the WLAN transmission channel, such as a high frequency network, and a WLAN path.

As described herein, rerouting network traffic from the millimeter-wave link to the WLAN transmission channel can be achieved by a FST function. For example, the FST function can be a seamless, low-latency interface switching function, which aims to proactively reroute network traffic to a WLAN, when use of a millimeter-wave network (such as, a 60 GHz network) is not possible due to LOS blockages, allowing for continued connectivity. In some examples, the computing device may also scan for alternative high frequency beams (e.g., 60 GHz beams) to sustain a connection.

Figure 4:
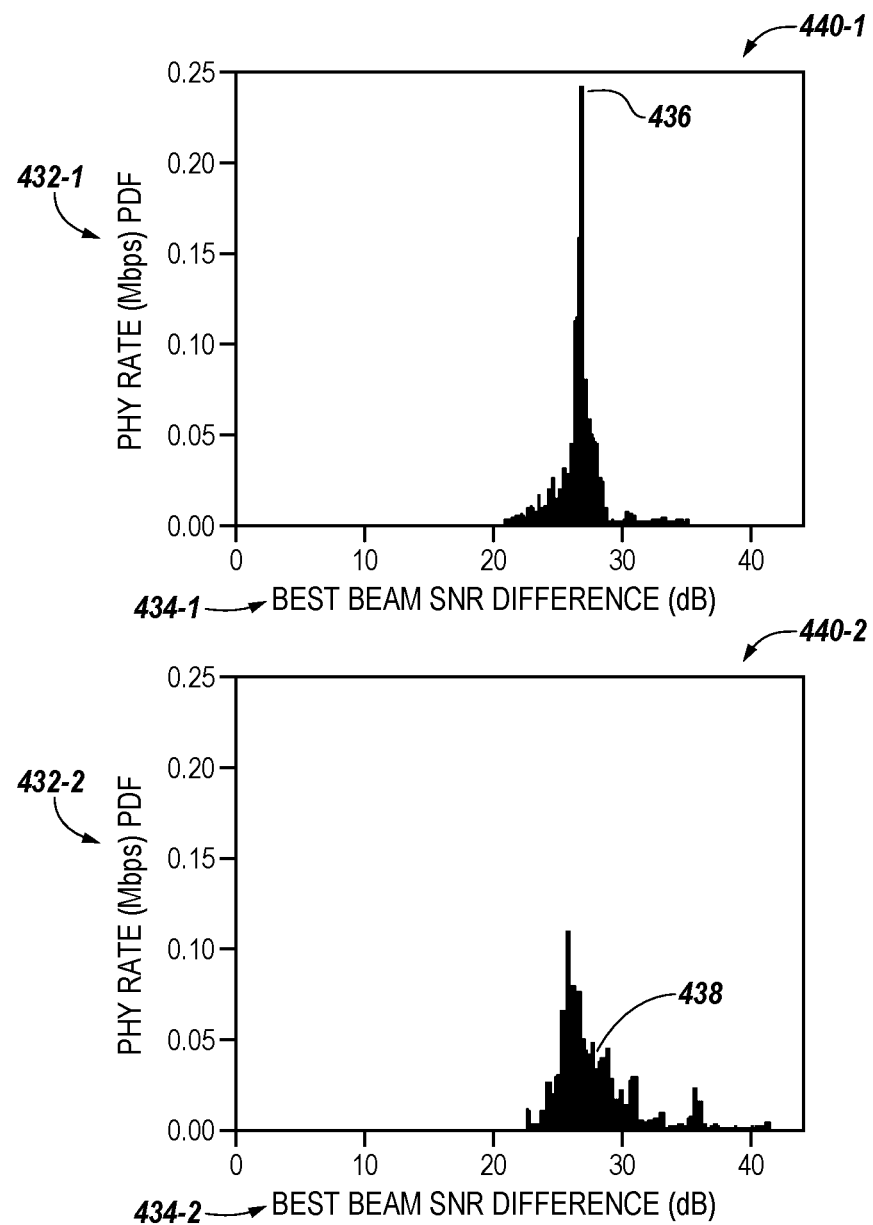
FIG. 4 illustrates an example of a first and second signal strength distribution between a millimeter-wave link beam and a WLAN beam consistent with the present disclosure.

FIG. 4 illustrates an example of a first and second signal strength distribution between a millimeter-wave link beam and a WLAN beam consistent with the present disclosure. As described herein, the computing device can proactively identify LOS blockage by comparing an SNR of a millimeter-wave link and an SNR of a WLAN transmission channel. The computing device may proactively detect LOS blockage based on the finding that identical obstacles and/or NLOS reflectors can have an effect on signal strength change of a millimeter-wave link to a WLAN transmission channel as a result of the frequency difference, as shown in FIG. 4.

For example, graph 440-1 illustrates the signal strength difference distribution between a high frequency beam and a WLAN path when the LOS is open, while graph 440-2 illustrates the signal strength difference distribution between a high frequency beam and a WLAN path when there is LOS blockage. As illustrated by graph 440-1 and 440-2, the signal strength distribution between a millimeter-wave link beam and a WLAN beam can be based on a comparison of the PHY rate 431-1, 431-2 and the SNR between a high frequency beam and a WLAN path 434-1, 434-2.

As described herein, when the LOS is open, the signal strength distribution between a high frequency beam and a WLAN path closely match the hardware power budget different, which may be 27 dB. The hardware budget difference may include transmit power, beamforming gain, and noise power difference between the high frequency and the WLAN interface. When the LOS is blocked, the signal strength distribution between a high frequency beam and a WLAN path shows higher variance which may exceed the predetermined threshold from the hardware power budget different, which may be 27 dB. When LOS is blocked, there is a higher variance because an identical obstacle attenuates the signal strength of a high frequency beam and a WLAN path differently, and an identical NLOS reflector causes distinct reflection loss on the high frequency beam and the WLAN path due to the disparate wavelengths and penetration/scattering properties.

As described herein, the computing device may proactively identify LOS blockage by comparing the SNR between the high frequency beam and a WLAN path. Once strong blockage occurs, the SNR may diverge from the hardware link budget difference, indicating LOS blockage. For example, distribution 436 indicates a divergence from the hardware link budget of 1.78 dB. Thus, the difference of the SNR between the high frequency beam and the WLAN path for an interval does not exceed the predetermined threshold of 3 dB from the hardware power budget difference which indicates there is an open LOS. Distribution 438 indicates a divergence from the hardware link budget of 4.25 dB. Thus, the difference of the SNR between the high frequency beam and the WLAN path for an interval does exceeds the predetermined threshold of 3 dB from the hardware power budget difference which indicates there is LOS blockage.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:

1. A computing device, comprising:
    a processing resource; and
    a memory resource storing machine-readable instructions to cause the processing resource to:
        proactively identify a line-of-sight (LOS) blockage of a network signal transmitted on a millimeter-wave link by comparing signal strength associated with the millimeter-wave link to signal strength associated with a wireless local area network (WLAN) transmission channel; and
        reroute network traffic from the millimeter-wave link to the WLAN transmission channel in response to the proactive identification of the LOS blockage of the network signal, wherein the LOS blockage is identified based on a difference existing between the signal strength associated with the millimeter-wave link and the signal strength associated with WLAN link determined by the signal strength comparison.

2. The computing device of claim 1, wherein the millimeter-wave link comprises a 60 gigahertz (GHz) network.

3. The computing device of claim 1, wherein the WLAN transmission channel comprises a wireless communication channel in a plurality of overlapping channels belonging to a particular WLAN frequency band.

4. The computing device of claim 1, wherein the LOS blockage of the network signal of the millimeter-wave link is determined based on a difference between a first signal-to-noise ratio (SNR) of the millimeter-wave link and a second SNR of the WLAN transmission channel.

5. The computing device of claim 4, wherein the difference exceeds a predetermined threshold from a hardware power budget difference.

6. The computing device of claim 1, wherein the LOS blockage comprises a partial LOS blockage or a near line-of-sight (NLOS) blockage.

7. A non-transitory machine-readable storage medium having stored thereon machine-readable instructions to cause a computing processor to:
    compare a first signal-to-noise ratio (SNR) of a millimeter-wave link and a second SNR of a wireless local area network (WLAN) transmission channel;
    proactively identify a line-of-sight (LOS) blockage of a network signal transmitted on a millimeter-wave link based on a difference between the first SNR and the second SNR; and
    reroute network traffic from the millimeter-wave link to the WLAN transmission channel in response to identifying the LOS blockage of the network signal.

8. The medium of claim 7, wherein comparing the first SNR and the second SNR occurs over a particular time interval.

9. The medium of claim 7, comprising instructions to prevent false LOS blockage detection by monitoring a high frequency physical layer (PHY) rate, wherein an average rate less than a particular PHY rate indicates LOS blockage.

10. The medium of claim 7, comprising instructions to perform a beam scan of a wireless local area network to detect a millimeter-wave network.

11. The medium of claim 7, wherein proactively identifying the LOS blockage includes utilizing PHY layer feedback and high frequency Media Access Control (MAC)-layer feedback.

12. The medium of claim 11, wherein the PHY layer feedback includes WLAN and high frequency band Channel State Information (CSI).

13. The medium of claim 11, wherein the high frequency MAC-layer feedback includes packet error rate and PHY transmission rate statistics.

14. The medium of claim 7, wherein the LOS blockage comprises a partial LOS blockage or a near line-of-sight (NLOS) blockage.

15. A method comprising:
    determining, by a network device, a first signal-to-noise ratio (SNR) of a millimeter-wave link;
    determining, by the network device, a second SNR of a wireless local area network (WLAN) transmission channel;
    comparing, by the network device, the first SNR and the second SNR;
    proactively identifying, by the network device, a line-of-sight (LOS) blockage of a network signal transmitted on a millimeter-wave link based on a difference between the first SNR and the second SNR, wherein the difference exceeds a predetermined threshold; and
    rerouting network traffic from the millimeter-wave link to the WLAN transmission channel in response to identifying the LOS blockage of the network signal.

16. The method of claim 15, wherein rerouting network traffic from the millimeter-wave link to the WLAN transmission channel is achieved by a fast session transfer (FST) function.

17. The method of claim 15, wherein comparing the first SNR and the second SNR determines whether there is an open LOS.

18. The method of claim 15, wherein the LOS blockage comprises a partial LOS blockage or a near line-of-sight (NLOS) blockage.

* * * * *